R. V. MORSE.
ELECTRIC SIGHT CONTROLLING MECHANISM FOR ANTI-AIRCRAFT GUNS.
APPLICATION FILED SEPT. 13, 1917.

1,343,003. Patented June 8, 1920.
2 SHEETS—SHEET 2.

UNITED STATES PATENT OFFICE.

ROBERT V. MORSE, OF ITHACA, NEW YORK, ASSIGNOR TO MORSE INSTRUMENT COMPANY, INC., OF ITHACA, NEW YORK, A CORPORATION OF NEW YORK.

ELECTRIC SIGHT-CONTROLLING MECHANISM FOR ANTI-AIRCRAFT GUNS.

1,343,003. Specification of Letters Patent. Patented June 8, 1920.

Application filed September 13, 1917. Serial No. 191,269.

*To all whom it may concern:*

Be it known that I, ROBERT V. MORSE, a citizen of the United States, residing at Ithaca, in the county of Tompkins and State of New York, have invented a new and useful Electric Sight-Controlling Mechanism for Anti-Aircraft Guns, of which the following, taken with the accompanying drawings, is a specification.

This invention relates to the sighting mechanism of anti-aircraft guns, and particularly to the means for continuously readjusting the sight angle of elevation as the angle of position of the enemy aircraft changes as it flies. These anti-aircraft guns are stationed on the earth and fire at such hostile aircraft as come within their range. Since the range and angle of position of the target varies rapidly, in most cases any fixed setting of the sight will become inaccurate after a few seconds time, so that the sight must be continually reset. The object of the present invention is to continuously and automatically vary the angle of elevation of the sight, so that when set for a target at a certain flying level it will keep the sight correctly adjusted for all ranges and angles of position which the target may assume while flying at that level. The apparatus may also be arranged to operate for all angles of position on a constant range basis if desired; but by using the altitude or flying level as a basis the fire of several batteries can be coördinated and the altitude closely estimated,—since the same altitude data can be used by the different guns irrespective of their location. Another object of my invention is to maintain an approximately correct sight setting in case the aircraft dives vertically in an effort to confuse the gunners by rapidly changing the flying level. Other objects will appear as the description proceeds. In general the objects are to increase the accuracy of anti-aircraft artillery fire.

Figure 1:
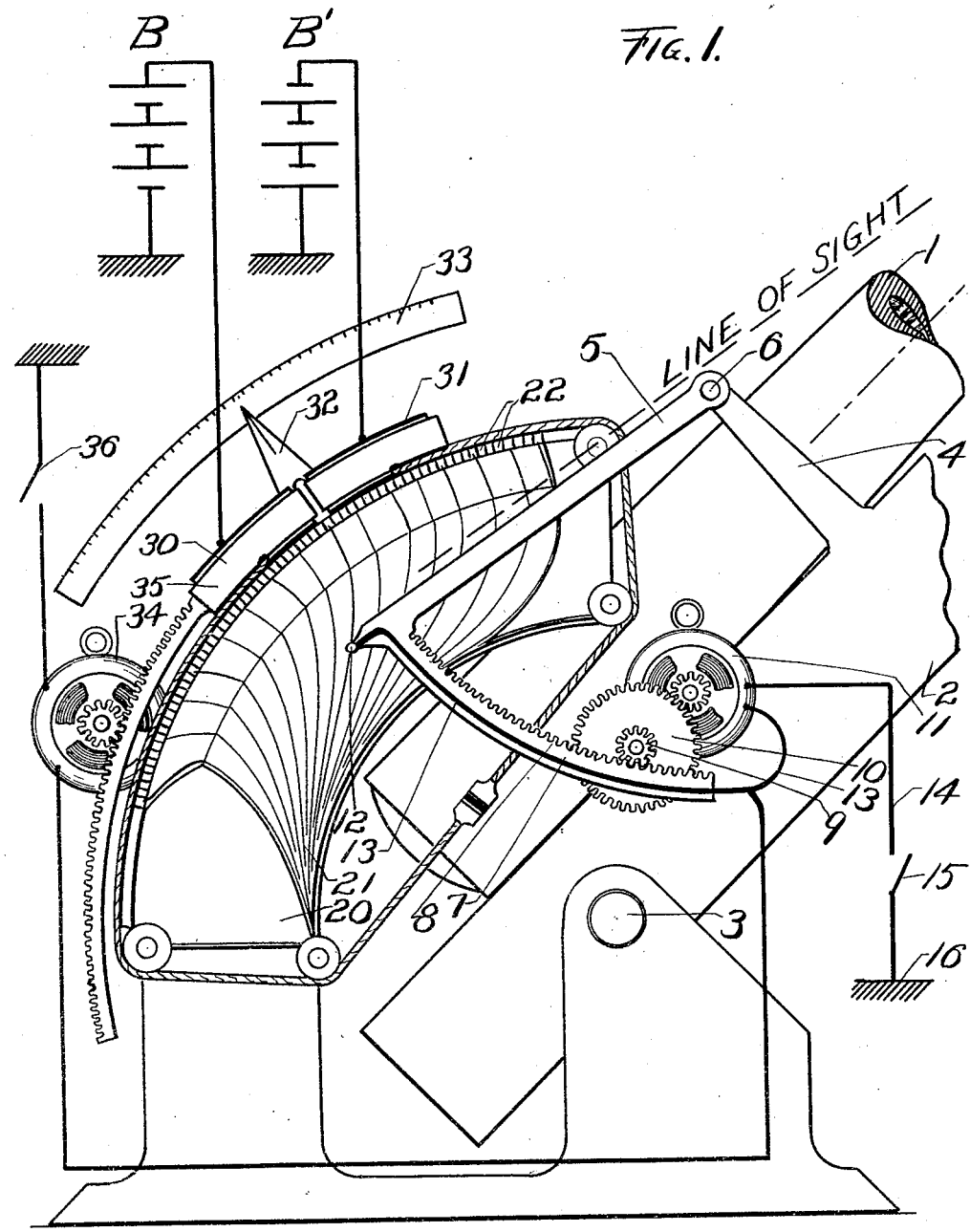
Figure 2:
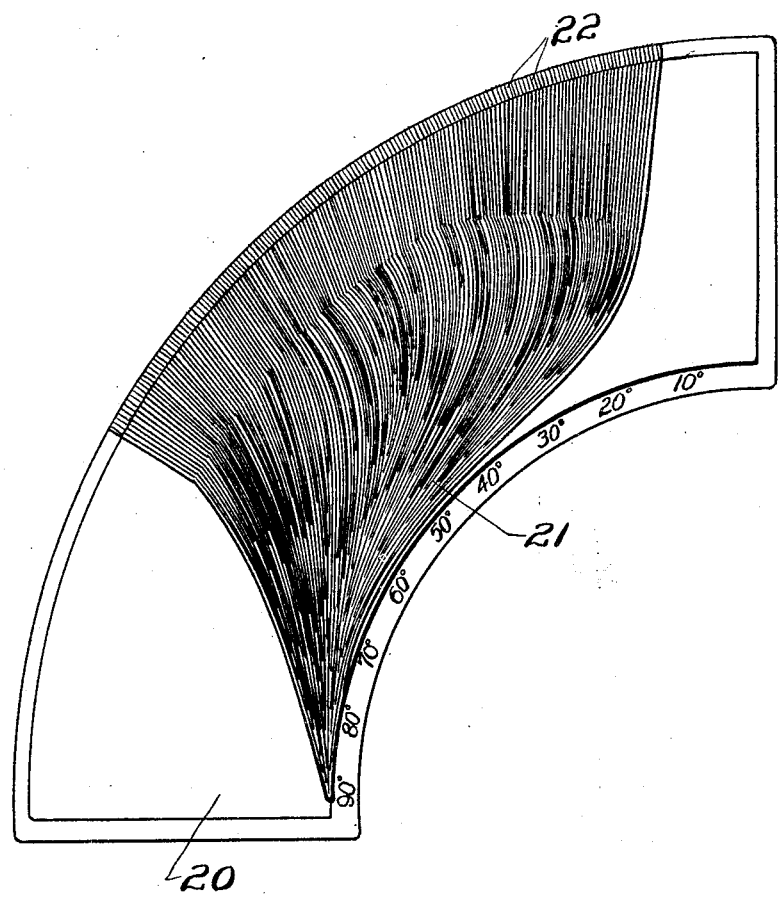

In the drawings forming part of this specification, Figure 1 illustrates a form of sight controlling apparatus embodying the principles of this invention; Fig. 2 shows the main controlling element taken by itself.

The fundamental principle of the device is simple; thin copper strips are bent to conform to the desired sight elevation curves, and permanently embedded in an insulating locking medium, such as bakelite for example. A contact point is arranged to play over the exposed edges of these strips, and the electrical system is arranged so that the contact point will automatically follow any designated strip. The slight power required to move the sight bar and contact point is furnished by a small electric motor, which may be run from dry cells or a hand-power generator. This motor may be easily replaced in the field if necessary, as the accuracy of the device does not depend upon any particular setting of the electric motor. The apparatus gives a continuous accurate sight setting for all elevation angles of the target for any altitude.

Referring to Fig. 1, the gun 1 carried on the recoil cylinders 2 is mounted to swing on the trunnions 3. The bracket 4 is attached to the recoil cylinder 2 or other part which swings with the gun, so that the bracket 4 participates in the vertical swinging movements of the gun 1 around the trunnions 3. The sight bar 5 is pivoted to the bracket 4 at the pivot 6, and is elevated and lowered by the shank 7, which is in the form of a circular arc whose center is the pivot 6. The sight bar 5 extends parallel to the line of sight and may have attached thereto any suitable form of sight,—preferably of the telescopic variety. The shank 7 is attached to the sight bar 5 and is provided with gear teeth 8 on its inner side which engage with the pinion 9. The pinion 9 is driven through suitable gears 10 by the small electric motor 11. This motor 11 receives its electric energy through the contact point 12 on the end of the sight bar 5, by way of the wire 13. After passing through the motor 11 the electric current passes through the wire 14 and switch 15 to the ground 16. The motor 11 moves the shank 7 and sight bar 5 up or down according as a positive or negative potential meets the contact point 12. The elements described thus far comprise the normally moving parts of the apparatus, and participate in the vertical swinging movements of the gun and also are moved by the electric motor 11 to continuously correct the line of sight. The motor 11 of course might be mounted near the trunnion 3 if desired, and could then operate without participating in the swinging movements of the gun if the gear which it drives were concentric with the trunnion. It is important in a practical apparatus to have the moving parts thus few and simple.

The part of the apparatus which we will now consider has the function of supplying say negative electricity to the control point 12 when the sight elevation is too low, and positive electricity when the sight elevation is too high, thus keeping the sight elevation continuously correct through the operation of the motor 11. This controlling element of the device consists of a control block 20, (illustrated separately in Fig. 2), which may be arranged as a sector concentric with the trunnion 3 or in any other convenient form. In the control block 20 are permanently embedded conductor strips 21, insulated from each other and curved to give the proper sight elevation for any angle of projection, (or angle of position if desired), each strip 21 being adapted for a certain altitude or range of the target, (preferably altitude). Where the control block is arranged as a sector for example, these curves may be obtained as follows: The sight elevations for all angles of projection with the target at a constant altitude having been computed, the angles of projection are laid off as circular abscissæ on the quadrant edge of the sector as shown in Fig. 2, and ordinates, representing angles of sight elevation, are laid off on arcs struck up from the base quadrant with the pivot 6 as a center and the sight bar 5 as a radius. This gives the curve which the contact point 12 must follow in order to give the proper angle of sight elevation for the given altitude for any angle of projection. There are a large number of these strips, say one hundred, only a few being shown in Fig. 1, for the sake of clearness. The curvature of say every tenth one of these strips 21 should be accurately determined, thus serving as guides to the curvature of the intermediate strips in assembling. Thus the apparatus may have say one hundred accurate constant altitude curves,—say a separate curve for each fifty yards increase in altitude from 500 yards to 5500 yards. The copper strips 21 may be very closely spaced so that the contact point 12 rides smoothly over their exposed edges. After the strips have been assembled in their final form the whole mass may be impregnated with some suitable substance such as bakelite, condensite, etc., making the control block 20 a rigid, hard, practically indestructible body,—only the edges of the strips 21 being left exposed. Each conductor strip 21 is led out to a small contact segment 22 which may be arranged like commutator segments on the outer edge of the control block 20. Through these contact segments 22 suitable potential is supplied to the strips 21,—the strips 21 below the designated altitude one potential and those above that altitude receiving an opposite potential, as will be described.

The entire apparatus may be considered as consisting of three parts; (1st) the sight bar elevating mechanism, consisting of the sight bar 5, contact point 12, shank 7, gears 9, 10, and motor 11; (2nd) the control block, consisting of the conductor strips 21 and contact segments 22; (3d) the altitude control brushes, with their control motor and altitude scale. The construction of parts (1) and (2) has been described above, and we will now consider part (3).

A pair of brushes 30, 31, separated by the width of a single contact segment 22 are arranged to slide over the surface of the contact segments 22. One brush, say brush 30, is supplied with a positive potential from the battery B; the other brush 31 is supplied with negative potential from the battery B'. Thus all the conductor strips 21 on one side of a certain strip are energized with negative potential, while all on the other side of that particular strip have positive potential. The particular strip which is to be the dividing line is determined by the location of the gap between the brushes 30, 31. A pointer 32 is attached to the brushes 30, 31 over the gap between them, and plays over a suitable scale 33 which is graduated to correspond to the altitudes for which the curvatures of the various strips 21 were designed. Thus if the pointer 32 is set at 3000 yds. on the altitude scale 33, all the conductor strips 21 for altitudes below 3000 yds. will have one potential, and all strips 21 for altitudes above 3000 yds. will have the opposite potential. The contact point 12 operated by the motor 11 will thus move automatically to a definite position on the 3000 yd. strip 21, corresponding to the angle of projection of the gun at that time, and will follow the elevation indicated by that strip for every angle of projection that the gun may assume in following the target. The brushes 30, 31 may be set for any desired altitude by hand. A small electric motor 34 is geared to teeth on the brush frame 35 which carries the brushes 30, 31, and this motor circuit is also connected to the contact point 12 on the sight bar 5. This circuit goes from the contact point 12 to the motor 34, then through the wire and switch 36 to the ground. The motor 34 is interchangeable with the motor 11; and as the motor 34 is not so essential to the operation of the mechanism as is the motor 11, it can be substituted for the motor 11 in case the latter should be disabled in the field. However, a third spare motor can easily be carried in the field.

The operation is as follows: the target having been sighted and its flying altitude announced by the officer controlling the fire, the pointer 32 is set opposite that altitude on the scale 33. The switch 36 is left open and the switch 15 is closed, and the gun manipulated to bring the line of sight on the point at which the burst is desired. If the contact point 12 lies below the proper elevation, the current flowing through the battery B' to brush 31, copper strips 21, contact point 12, wire 13, motor 11, wire 14, switch 15, to ground,—will operate the motor 11 so as to elevate the sight bar 5 through the operation of the gears 9, 10 and shank teeth 8. On the other hand, if the contact point 12 lies above the proper elevation, it will receive current of the opposite potential from the battery B,—which flowing to the brush 30 and by a similar circuit through the motor 11, will turn the motor in the opposite direction so as to bring the sight bar 5 down to the proper elevation. These operations are more or less continuous as the gun swings up and down in following the flying target, and thus brings copper strips 21 momentarily under the contact point 12. Thus so long as the target flies at the given altitude the sight angle of elevation will be continuously, automatically and accurately set. When the target changes its flying altitude the pointer 32 is moved to a new position on the altitude scale 33,—in accordance with the orders from the fire control officer. Should the flying target dive suddenly in an attempt to throw off the gunners, or should the target attempt any movement in a vertical cylindrical plane whose central axis passes through the gun, the switch 15 is opened and the switch 36 closed. This holds the sight elevation constant and automatically varies the altitude setting to correspond to the changing altitude; this is in accordance with the principle which I have discovered, namely, that curves of constant sight setting are substantially vertical in the region effectively swept by the fire of the gun in high fire. In other words, when a flying target moves in any direction in a cylindrical zone whose central axis is vertical through the gun, the changing angle of position offsets the changing range in such a manner that the angle of sight elevation is a constant. The elevation of the contact point 12 being held constant, the motor 34 will operate the brush frame 35 and brushes 30, 31,—making the pointer 32 automatically follow the changing altitude of the target, on the principle stated. When the target ceases to dive and resumes substantially horizontal flight, the switch 36 is opened and the switch 15 simultaneously closed. The apparatus then continues to work on a constant altitude basis,—but at a new altitude, which has been automatically determined. This new altitude setting is soon checked by advice from the officer in general control of all the fire,—and if inaccurate is reset according to his order. The automatic determination by means of the switch 36 serves to give an approximately accurate setting during the interim when more exact data is lacking, so that the fire on the target may be continuous. When the change in altitude is more gradual,—not a vertical dive nor in a cylindrical zone,—the altitude indicator 32 is adjusted by hand.

The apparatus which has been described is merely by way of illustration to show the principles of operation. The apparatus of course need not be directly applied to a gun, but may be built into any fire control apparatus controlling the gun indirectly, by connecting it to that element of the fire control apparatus whose motion corresponds to that of the gun. Of course the installations may vary in detail to adapt themselves to the type of gun and type of sight employed. The contact segments 22 and sliding brush control 30, 31, 32, 33 need not be placed directly on the control block 20 but may be placed at a distance if desired and connected to the conductor strips 21 through a cable containing wires leading from the strips 21 to the contact segments 22. Also, it will be obvious that since all motion is relative, apparatus embodying the essential principles of this invention may be designed in which the control block swings through the primary angular movement and the contact point is stationary except for the desired secondary motion imparted to it.

Many other variations and adaptations within the scope of the invention as indicated by the following claims will be apparent to those skilled in the art.

I claim as my invention;

1. In an automatic sight controlling mechanism for anti-aircraft artillery, the combination of a contact point, electrically operated means for moving the contact point, a number of conductor strips upon which the contact point bears, said strips being curved to correspond to the desired operating curves of the mechanism, means for moving the contact point relative to the conductor strips simultaneously with the vertical swinging movements of the gun, means for supplying the strips on opposite sides of a given strip with opposite electrical potential whereby the contact point as it passes over the strips will be raised or lowered by the electrically operated means so as to follow the given strip, means for determining the strip which is to be said given strip, and means operated by said electrically operated means for determining the angle of sight elevation of the gun.

2. In an automatic sight controlling mechanism for anti-aircraft artillery, the combination of a contact point, electrically operated means for moving the contact point, a number of conductor strips upon which the contact point bears, said strips being curved to correspond to the desired operating curves of the mechanism, means for moving the contact point relative to the conductor strips simultaneously with the vertical angular movements of the gun, brushes for supplying the strips on opposite sides of a given strip with opposite electrical potential whereby the contact point as it passes over the strips will be raised or lowered by the electrically operated means so as to follow the given strip, means for moving the brushes to select the strip which is to be said given strip, and means operated by said electrically operated means for determining the angle of sight elevation of the gun.

3. In an automatic sight controlling mechanism for anti-aircraft artillery, the combination of a contact point, electrically operated means for moving the contact point, a number of conductor strips upon which the contact point bears, said strips being curved to correspond to the desired operating curves of the mechanism, means for moving the contact point relative to the conductor strips simultaneously with the vertical angular movements of the gun, brushes for supplying the strips on opposite sides of a given strip with opposite electrical potential whereby the contact point as it passes over the strips will be raised or lowered by the electrically operated means so as to follow the given strip, a second electrically operated means for changing the location of the brushes relative to the conductor strips, and means operated by the first mentioned electrical means for determining the angle of sight elevation of the gun.

4. In an automatic sight controlling mechanism for anti-aircraft artillery, the combination of a control block comprising a number of conductor strips curved to correspond to the desired operating curves of the mechanism, means for giving adjacent groups of said strips opposite electrical potential, means for varying the location of the boundary between said groups, a contact point arranged to play over the conductor strips of the control block, means for moving the contact point relative to the control block simultaneously with the vertical angular movements of the gun, and electrically operated means energized through the movable contact point for moving that contact point relative to the control block and determining the angle of sight elevation of the gun.

5. In an automatic sight controlling mechanism for anti-aircraft artillery, the combination of a control block comprising a number of conductors arranged in curves corresponding to the desired operating curves of the mechanism, a contact point arranged to play over the conductors of the control block, means actuated by the vertical angular movements of the gun causing relative motion between the contact point and the control block, and means energized by an electric circuit passing through the contact point for controlling the angle of sight elevation of the gun.

6. In an automatic sight controlling mechanism for anti-aircraft artillery, the combination of a control block comprising a number of conductors arranged in curves corresponding to the desired operating curves of the mechanism, a contact point arranged to play over the conductors of the control block, means actuated by the vertical angular movements of the gun for causing relative motion between the point and block simultaneously with the vertical angular movements of the gun, electrically operated means for causing relative motion between the point and block corresponding to the variable sight angle of elevation of the gun, and means for determining the conductor of the contact block to be followed by the contact point.

7. In an automatic sight controlling mechanism for anti-aircraft artillery, the combination of electrically operated means for determining the sight angles of elevation for various angles of projection for a target at a constant altitude, and a second electrically operated means for varying the altitude setting of the mechanism for various angles of projection and a constant sight angle of elevation.

8. In an automatic sight controlling mechanism for anti-aircraft artillery, the combination of a control block comprising a number of conductors arranged to correspond to the desired operating curves of the machine, a contact point arranged to play over the conductors of the control block, means for causing the contact point to follow any designated conductor of the control block, and means connected with the contact point for determining the angle of sight elevation of the gun.

9. In an automatic sight controlling mechanism for anti-aircraft artillery, the combination of means for determining the angle of sight elevation for a target having various angles of position but a constant altitude, and means for varying the altitude setting for various angles of position but with a constant sight angle of elevation.

In witness whereof I have hereunto set my hand this 7th day of September, 1917.

ROBERT V. MORSE.

Witnesses:
ERNEST H. WANZER,
F. S. BARR.